(12) United States Patent
Inoue et al.

(10) Patent No.: US 9,809,179 B2
(45) Date of Patent: Nov. 7, 2017

(54) ELECTRICAL WIRE GUIDING APPARATUS

(71) Applicant: Sumitomo Wiring Systems, Ltd., Yokkaichi, Mie (JP)

(72) Inventors: Hiroshi Inoue, Mie (JP); Go Ueno, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 0 days.

(21) Appl. No.: 15/259,652

(22) Filed: Sep. 8, 2016

(65) Prior Publication Data

US 2017/0066393 A1 Mar. 9, 2017

(30) Foreign Application Priority Data

Sep. 9, 2015 (JP) ................. 2015-177533

(51) Int. Cl.
| | |
|---|---|
| *H02G 11/00* | (2006.01) |
| *B60R 16/02* | (2006.01) |
| *F16B 47/00* | (2006.01) |
| *H02G 3/04* | (2006.01) |
| *B60R 16/027* | (2006.01) |

(52) U.S. Cl.
CPC ........ *B60R 16/0215* (2013.01); *F16B 47/003* (2013.01); *H02G 3/0406* (2013.01); *H02G 3/0437* (2013.01); *B60R 16/027* (2013.01); *H02G 11/006* (2013.01)

(58) Field of Classification Search
USPC ............... 248/49, 53, 57, 58, 59, 60, 61, 63; 174/68.1, 259, 74 A, 86, 87, 88 R, 89, 91, 174/93; 59/78.1, 900
See application file for complete search history.

(56) References Cited

U.S. PATENT DOCUMENTS

| | | | | |
|---|---|---|---|---|
| 4,807,432 A | * | 2/1989 | Mauri ................ | H02G 11/006 248/49 |
| 5,698,477 A | * | 12/1997 | Iwamaru ............ | B60R 16/0207 428/343 |
| 6,349,534 B1 | * | 2/2002 | Zanolla ............... | H02G 11/006 248/49 |
| 7,451,589 B2 | * | 11/2008 | Howard .............. | E21F 17/02 248/49 |

(Continued)

FOREIGN PATENT DOCUMENTS

JP 2015074307 A 4/2015

*Primary Examiner* — Alfred J Wujciak
(74) *Attorney, Agent, or Firm* — Reising Ethington, P.C.

(57) ABSTRACT

An electrical wire guiding apparatus includes: an electrical wire guiding body that is configured by coupling multiple link members in a single line so as to be capable of undergoing curving deformation, and that receives insertion of electrical wires; a self-adhesive cloth member that has stretchability and is wrapped around the electrical wire guiding body in the circumference direction so as to envelop the electrical wire guiding body; and clips (fixing means) for fixing the self-adhesive cloth member to the electrical wire guiding body. The self-adhesive cloth member is wrapped around the electrical wire guiding body in the circumference direction so as to envelop it. Also, the self-adhesive cloth member is fixed to the link members by the clips, and therefore there is no risk of detachment from the electrical wire guiding body or becoming twisted.

3 Claims, 7 Drawing Sheets

(56) References Cited

U.S. PATENT DOCUMENTS

| | | | | |
|---|---|---|---|---|
| 7,493,750 | B2* | 2/2009 | Komiya | F16G 13/16 |
| | | | | 248/49 |
| 7,520,122 | B2* | 4/2009 | Kitagawa | F16G 13/16 |
| | | | | 248/49 |
| 7,849,667 | B2* | 12/2010 | Jaeker | F16G 13/16 |
| | | | | 248/49 |
| 7,893,353 | B2* | 2/2011 | Utaki | F16G 13/16 |
| | | | | 174/19 |
| 8,413,416 | B2* | 4/2013 | Egami | F16G 13/16 |
| | | | | 248/49 |
| 2002/0043591 | A1* | 4/2002 | Sakai | F16G 13/16 |
| | | | | 248/49 |
| 2006/0219848 | A1* | 10/2006 | Komiya | F16G 13/16 |
| | | | | 248/49 |

* cited by examiner

ELECTRICAL WIRE GUIDING APPARATUS

This application claims the benefit of Japanese Application No. JP2015-177533, filed on Sep. 9, 2015, the contents of which are hereby incorporated by reference in their entirety.

FIELD

The present invention relates to an electrical wire guiding apparatus.

BACKGROUND

JP 2015-074307A discloses an electrical wire guiding apparatus that is provided so as to span a vehicle body and a sliding door in an approximately horizontal manner. This electrical wire guiding apparatus is configured to include an electrical wire guiding body that is configured by coupling multiple link members in a single line and is capable of undergoing curving deformation, a body-side bracket for coupling one end portion of the electrical wire guiding body to the body, and a door-side bracket for coupling the other end portion of the electrical wire guiding body to the sliding door. A wire harness for supplying electrical power to electrical components and the like installed in the sliding door is inserted into the electrical wire guiding body and the two brackets. The electrical wire guiding body is covered with a rubber boot for the purpose of dust-proofing and water-proofing.

The rubber boot has a rectangular tube shape, and is slid over the electrical wire guiding body in the length direction thereof so as to encompass it. For this reason, if the length dimension of the electrical wire guiding body is large, the task of covering the electrical wire guiding body with the rubber boot becomes difficult.

The present design was achieved in light of the above-described situation, and an object thereof is to improve operability.

SUMMARY

An electrical wire guiding apparatus according to one embodiment includes: an electrical wire guiding body that is configured by coupling a plurality of link members in a single line so as to be capable of undergoing curving deformation, and that receives insertion of an electrical wire; a self-adhesive cloth member that has stretchability and is wrapped around the electrical wire guiding body in a circumference direction so as to envelop the electrical wire guiding body; and a fixing means for fixing the self-adhesive cloth member to the electrical wire guiding body.

The self-adhesive cloth member is wrapped around the electrical wire guiding body in the circumference direction so as to envelop it, and therefore this operation can be completed easily even if the electrical wire guiding body is long. Also, the self-adhesive cloth member is fixed to the electrical wire guiding body by the fixing means, and therefore there is no risk of detachment from the electrical wire guiding body or becoming twisted. Note that the self-adhesive cloth member is defined as a member obtained by adhering a self-adhesive agent such as natural rubber to a cloth-like member made of woven cloth or the like, and portions of the self-adhesive cloth member are brought into close contact with each other and held in the state of being in close contact with each other.

DRAWINGS

DESCRIPTION

In the electrical wire guiding apparatus according to the above aspect, the fixing means may be a clip that is a part separate from the link members and the self-adhesive cloth member and that sandwiches the self-adhesive cloth member with a link member among the plurality of link members.

According to this configuration, by attaching the clip to the outer side of the self-adhesive cloth member, it is possible to fix the self-adhesive cloth member to a link member.

Furthermore, the clip may have a locking protrusion that is locked to a receding portion of a coupling portion for coupling link portions to each other.

According to this configuration, by fitting the locking protrusion into the receding portion of the coupling portion, it is possible to prevent the clip from becoming detached from the link member.

In the electrical wire guiding apparatus according to the above aspect, the fixing means may be a hooking portion that can be locked to the self-adhesive cloth member and is integrally formed with a link member among the plurality of link members.

According to this configuration, the hooking portion, which is the fixing means, is integrally formed with the link member, and therefore the number of necessary parts is lower than in the case where the fixing means is configured by a part that is separate from the link member.

First Embodiment

Figure 1:
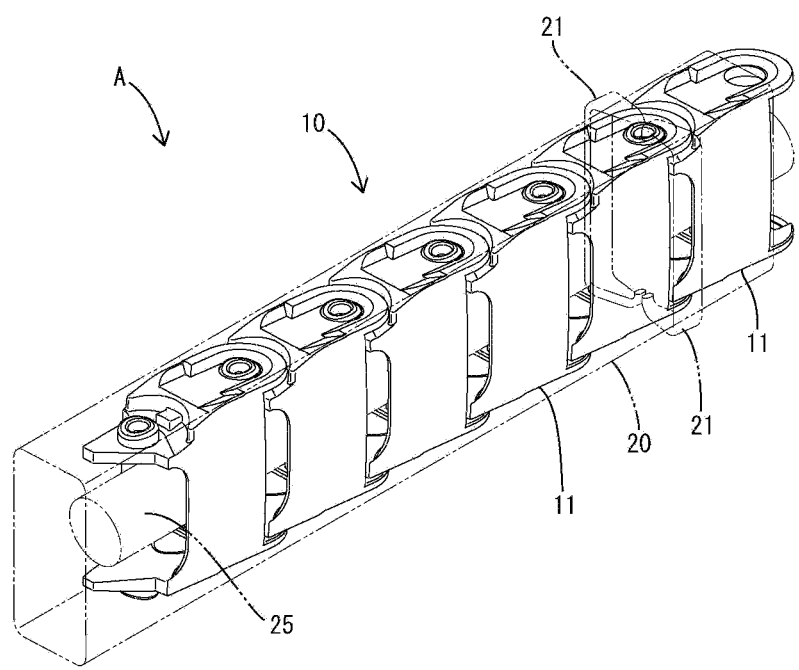
FIG. 1 is a perspective view of an electrical wire guiding apparatus according to a first embodiment.
Figure 2:
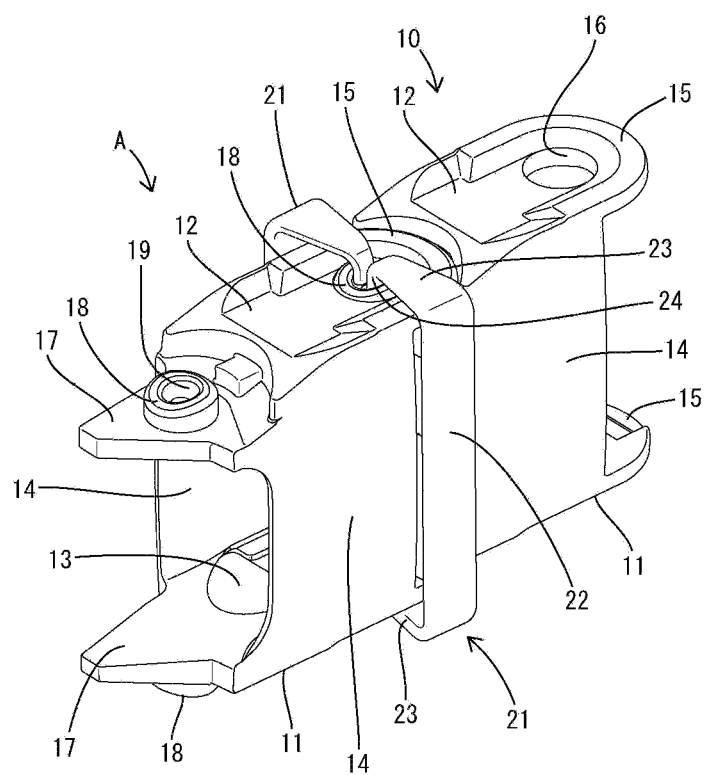
FIG. 2 is a perspective view showing a state where clips have been attached to a link member.
Figure 3:
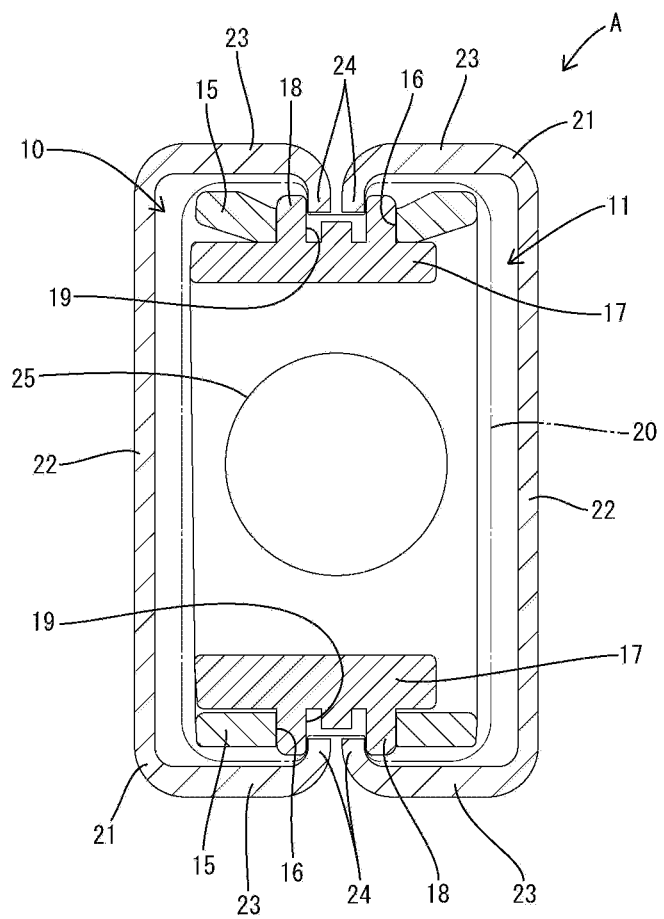
FIG. 3 is a cross-sectional view of the electrical wire guiding apparatus.
Figure 4:
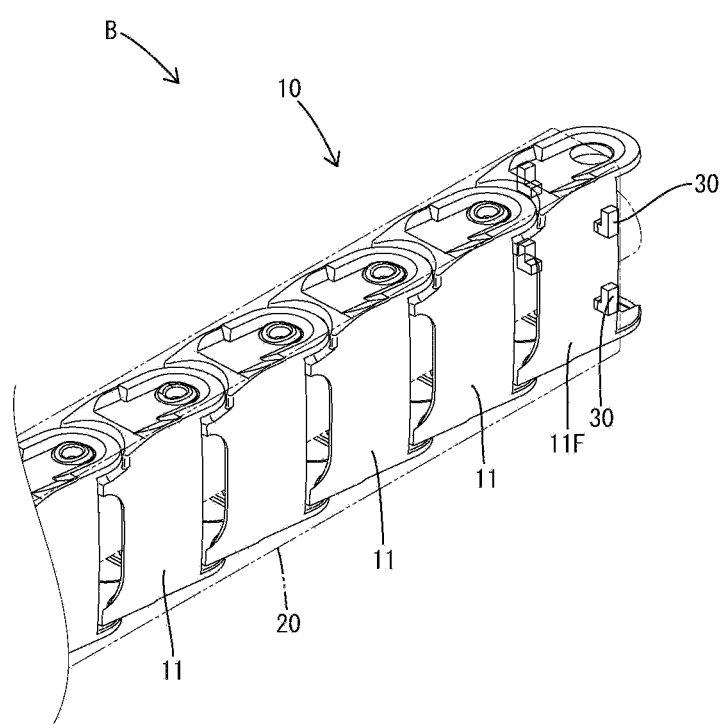
FIG. 4 is a perspective view of an electrical wire guiding apparatus according to a second embodiment.
Figure 5:
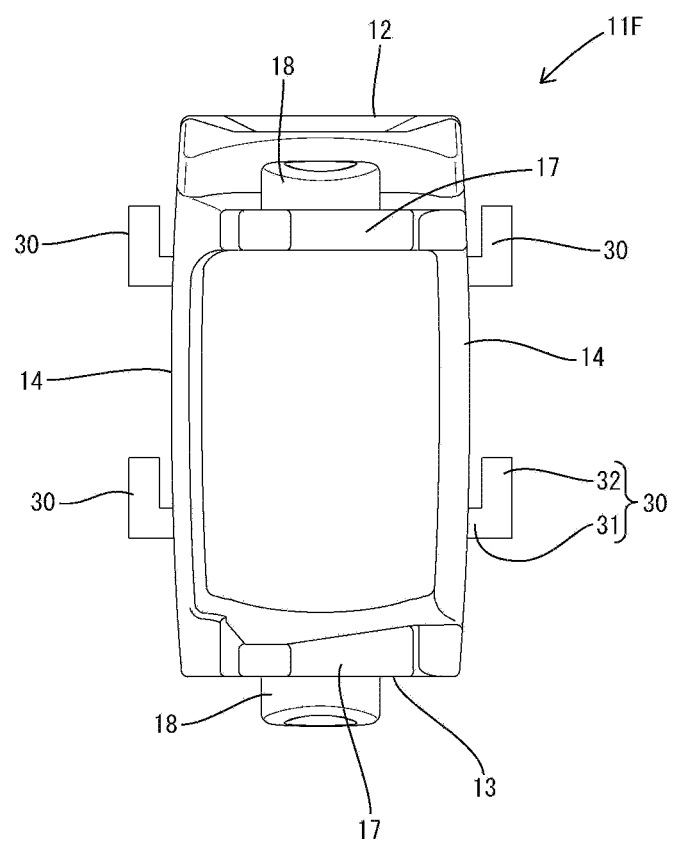
FIG. 5 is a front view of a fixing link member.
Figure 6:
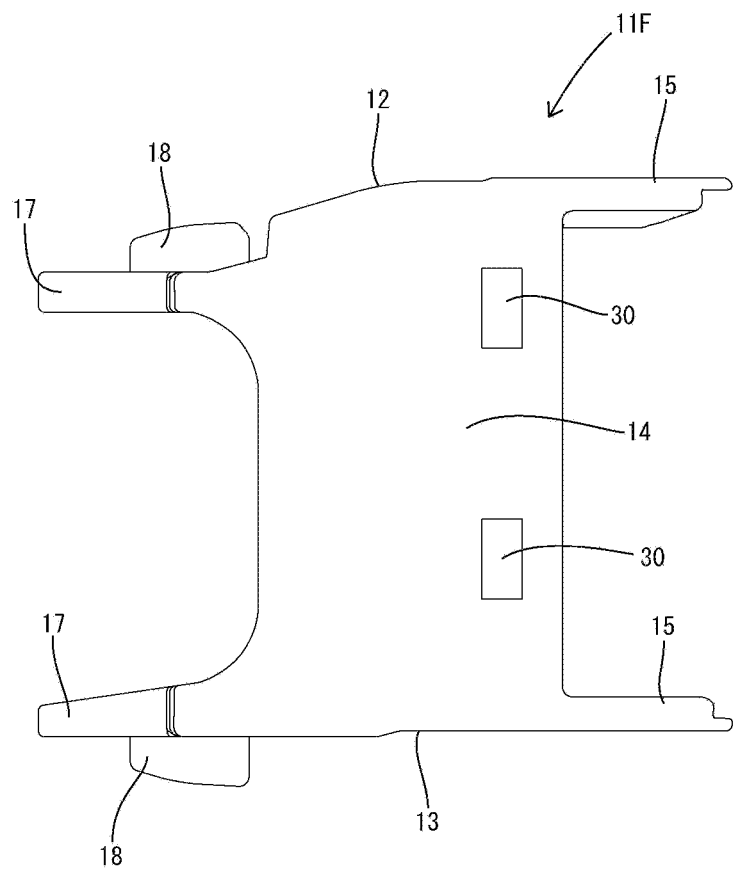
FIG. 6 is a side view of a fixing link member.
Figure 7:
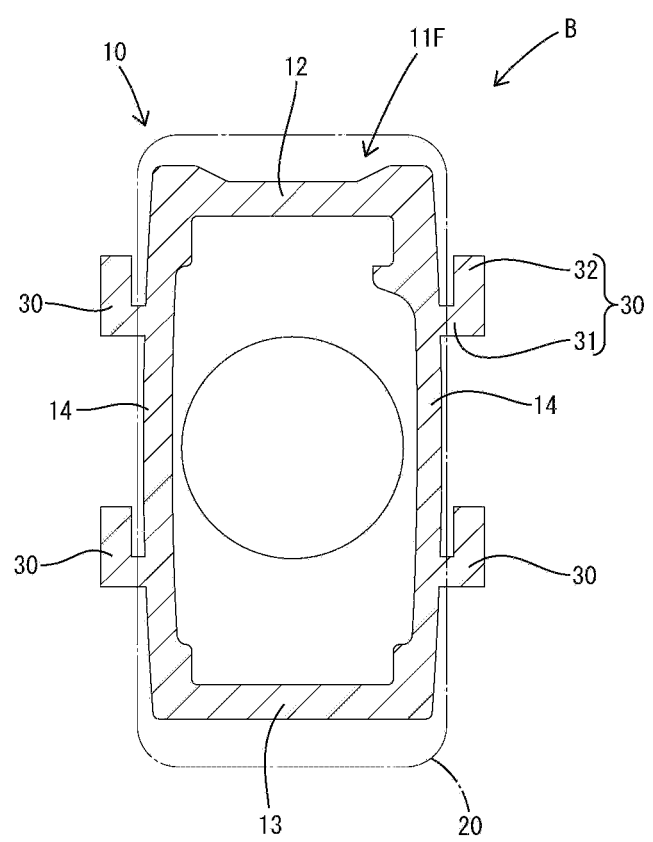
FIG. 7 is a cross-sectional view of the electrical wire guiding apparatus.

Hereinafter, a first embodiment will be described with reference to FIGS. 1 to 3. An electrical wire guiding apparatus A of the first embodiment is provided so as to span a vehicle body (not shown) and a sliding door (not shown) that opens and closes a doorway in a side surface of the vehicle body, so as to span the cabin floor (not shown) of a vehicle body and a sliding seat (not shown), or the like. The electrical wire guiding apparatus A is configured to include one long and thin electrical wire guiding body 10, a self-adhesive cloth member 20 for protecting the electrical wire guiding body 10, and clips 21 (the fixing means recited in the claims) for fixing the self-adhesive cloth member 20 to the electrical wire guiding body 10. A wire harness 25 (the electrical wire recited in the claims), which is for supplying electrical power to electrical components such as a sliding seat reclining apparatus and a power window installed in the sliding door, is inserted into the electrical wire guiding apparatus A (electrical wire guiding body 10). The wire harness 25 is obtained by bundling together multiple sheathed electrical wires (not shown) that function as conduction paths for power supply.

The electrical wire guiding body 10 is configured by coupling multiple link members 11, which are made of a synthetic resin, in a single line so as to be able to pivot relative to each other in the horizontal direction. The link members 11 each have an upper plate portion 12, a lower plate portion 13, and left and right side plate portions 14, and are shaped as a rectangular tube overall. A pair of upper and lower bearing-side coupling portions 15, each having a circular bearing hole 16 that penetrates in the vertical direction, are formed in end portions of the upper plate portion 12 and the lower plate portion 13 on one side in the length direction of the electrical wire guiding body 10. A shaft-side coupling portion 17 (the coupling portion recited in the claims) provided with a shaft portion 18 that protrudes from the upper surface thereof is formed in the end portion of the upper plate portion 12 on the other side, and a shaft-side coupling portion 17 (the coupling portion recited in the claims) provided with a shaft portion 18 that protrudes from the lower surface thereof is formed in the end portion of the lower plate portion 13 on the other side.

Adjacent link members 11 are coupled to each other by fitting the pair of upper and lower shaft portions 18 into the pair of upper and lower bearing holes 16, so as to be able to pivot relative to each other, in the horizontal direction, and centered about a vertical axis. In the state where the shaft portions 18 and the bearing holes 16 have been fitted together, the upper surface of the upper shaft portion 18 and the lower surface of the lower shaft portion 18 are respectively exposed upward and downward inside the bearing holes 16. The upper surface of the upper shaft portion 18 and the lower surface of the lower shaft portion 18 are each provided with a receding portion 19 that is exposed to the outside and is shaped as a circle that is concentric with the shaft portion 18. These receding portions 19 are formed for the purpose of thickness reduction (the reduction of the wall thickness of the shaft portion 18 in order to suppress so-called "sink mark" deformation of the shaft portion 18 that occurs during die-cast molding), but they also function as means for locking a later-described clip 21.

The self-adhesive cloth member 20 is obtained by adhering a self-adhesive agent (not shown) such as natural rubber to the two surfaces of a cloth-like member made of woven cloth or the like. Note that the self-adhesive agent may be adhered to only one side of the cloth-like member. Woven cloth or non-woven cloth having stretchability is used as the cloth-like member. Examples of the material for the cloth-like member include: natural fibers such as cotton (arboreous cotton), silk, or hemp; synthetic fibers made of polyester, polyamide, acrylic resin, polyurethane, polyethylene, polypropylene, or the like; semisynthetic fibers such as acetate fibers; and recycled fibers such as rayon fibers or cupra fibers.

The cloth-like member is shaped as an approximately rectangular sheet. The long sides of the cloth-like member are set to approximately the same dimension as the length of the electrical wire guiding body 10. The short sides of the cloth-like member are set to a dimension obtained by adding an overlap margin to the circumference of the electrical wire guiding body 10 (link member 11). Here, the circumference refers to a dimension obtained by adding the width dimension of the upper plate portion 12, the width dimension of the lower plate portion 13, and the height dimensions of the left and right side plate portions 14. Also, the overlap margin refers to a dimension that corresponds to the width dimension of the upper plate portion 12 or the lower plate portion 13, or the height dimension of the side plate portions 14, for example.

The self-adhesive agent has adhesiveness capable of bonding with itself. The self-adhesive agent also has adhesiveness that exhibits bonding force with the cloth-like member as well. The adhesive force of this self-adhesive agent is a strength according to which the bonding of the self-adhesive agent to itself and the bonding of the self-adhesive agent and the cloth-like member is released when non-rupturing tensile force is applied to the cloth-like member. Also, examples of materials that can be used for the self-adhesive agent include natural rubber, a mixture of natural rubber and a synthetic rubber, and an acrylic polymer.

The self-adhesive cloth member 20 is wrapped around the outer surface of the electrical wire guiding body 10 such that the long sides extend along the length direction of the electrical wire guiding body 10, and one of the two edge portions along the long sides is overlaid on and brought into close contact with the outer surface of the other edge portion. The width dimension (or height dimension) of the overlapping region of these two edge portions is a dimension that corresponds to the aforementioned overlap margin. Also, due to the adhesive force of the self-adhesive agent, the two edge portions that extend along the long sides of the self-adhesive cloth member 20 are bonded together, and the self-adhesive cloth member 20 envelops the electrical wire guiding body 10 over the entire circumference thereof and over the entire length thereof. Note that in consideration of operability during overlaying of the two edge portions along the long sides, the self-adhesive cloth member 20 can be repeatedly attached and detached.

The clips 21 are made of a synthetic resin, and are each an individual part that is separate from the link members 11 and the self-adhesive cloth member 20. The clips 21 each include a body portion 22 that is long and thin in the vertical direction, a pair of upper and lower arm portions 23 that respectively extend horizontally from the upper and lower ends of the body portion 22, a locking protrusion 24 that protrudes downward from the extending end of the upper arm portion 23, and a locking protrusion 24 that protrudes upward from the extending end of the lower arm portion 23.

The clip 21 is assembled to a link member 11 in a state of sandwiching the self-adhesive cloth member 20. At this time, a pair of clips 21 are provided so as to sandwich one link member 11 from the left and right sides in a symmetrical manner. Also, the link member 11 to which the clips 21 are attached can be arbitrarily selected from among the link members located at terminals of the electrical wire guiding body 10, a link member 11 in the lengthwise central portion of the electrical wire guiding body 10, or the like.

In the state where a clip 21 is attached to a link member 11, the body portion 22 corresponds to the outer surface of one of the side plate portions 14 with the self-adhesive cloth member 20 therebetween, the upper arm portion 23 corresponds to the upper surface of the upper plate portion 12 with the self-adhesive cloth member 20 therebetween, and the lower arm portion 23 corresponds to the lower surface of the lower plate portion 13 with the self-adhesive cloth member 20 therebetween. Also, the upper locking protrusion 24 is fitted into the upper receding portion 19 with the self-adhesive cloth member 20 therebetween, and the lower locking protrusion 24 is fitted into the lower receding portion 19 with the self-adhesive cloth member 20 therebetween. Due to the pair of upper and lower locking protrusions 24 fitting into the receding portions 19, the clip 21 is held in a state of being attached to the link member 11, and the self-adhesive cloth member 20 is held in a state of enveloping the outer surface of the link member 11.

Here, in the case where the two edge portions along the long sides of the self-adhesive cloth member 20 are overlapped on the upper surface of the upper plate portion 12 or the lower surface of the lower plate portion 13, those two overlapping edge portions are sandwiched between one of the arm portions 23 and the upper plate portion 12 or the lower plate portion 13, and are pushed into the receding portion 19 by the biting effect of the locking protrusion 24, and therefore there is no risk of becoming peeled apart. Also, in the case where the two edge portions along the long sides are overlapped on the outer surface of one of the side plate portions 14, those two overlapping edge portions are sandwiched between the body portion 22 and the side plate portion 14, and thus the peeling apart thereof is prevented. Accordingly, the self-adhesive cloth member 20 is held in the state of enveloping the electrical wire guiding body 10. Also, the self-adhesive cloth member 20 has stretchability, and therefore movement of the electrical wire guiding body 10 during curving deformation of the electrical wire guiding body 10 is not hindered by the self-adhesive cloth member 20.

The electrical wire guiding apparatus A of the first embodiment includes: the electrical wire guiding body 10 that is configured by coupling multiple link members 11 in a single line so as to be capable of undergoing curving deformation, and that receives insertion of the wire harness 25; the self-adhesive cloth member 20 that has stretchability and is wrapped around the electrical wire guiding body 10 in the circumference direction so as to envelop the electrical wire guiding body 10; and the clips 21 for fixing the self-adhesive cloth member 20 to the electrical wire guiding body 10. Here, the self-adhesive cloth member 20 is defined as a member obtained by adhering a self-adhesive agent such as natural rubber to a cloth-like member made of woven cloth or the like, and portions of the self-adhesive cloth member 20 are brought into close contact with each other and held in the state of being in close contact with each other. The self-adhesive cloth member 20 is wrapped around the electrical wire guiding body 10 in the circumference direction so as to envelop it, and therefore this operation can be completed easily even if the electrical wire guiding body 10 is long. Also, the self-adhesive cloth member 20 is fixed to the link members 11 by the clips 21, and therefore there is no risk of detachment from the electrical wire guiding body 10 or becoming twisted.

Also, in the electrical wire guiding apparatus A of the first embodiment, the clips 21, which are parts separate from the link members 11 and the self-adhesive cloth member 20 and that sandwich the self-adhesive cloth member 20 with the link member 11, are used as the fixing means for fixing the self-adhesive cloth member 20 to the link member 11. According to this configuration, by attaching the clips 21 to the outer side of the self-adhesive cloth member 20, it is possible to fix the self-adhesive cloth member 20 to the link member 11. Also, the clips 21 each have the locking protrusions 24 that are locked to the receding portions 19 of the shaft-side coupling portions 17 that couple ring-shaped members together. According to this configuration, by fitting the locking protrusions 24 into the receding portions 19 of the coupling portions, it is possible to prevent the clips 21 from becoming detached from the link member 11.

Second Embodiment

Next, a second embodiment will be described with reference to FIGS. 4 to 7. An electrical wire guiding apparatus B of the second embodiment has a different configuration from the first embodiment with respect to the fixing means for fixing the self-adhesive cloth member 20 to the electrical wire guiding body 10. Other configurations are the same as in the first embodiment, and therefore the same configurations are denoted by the same reference signs, and descriptions will not be given for the structure, actions, and effects of such configurations.

In the electrical wire guiding apparatus B of the second embodiment, any one or more of the link members 11 that constitute the electrical wire guiding body 10 is a fixing link member 11F (the link member recited in the claims). The fixing link member 11F is arranged at an appropriately set location, such as at the two lengthwise end portions of the electrical wire guiding body 10, one of the lengthwise end portions of the electrical wire guiding body 10, or in the lengthwise central portion of the electrical wire guiding body 10. The fixing link member 11F is different from the other link members 11 in that it has a fixing means, and has the same shape as the other link members 11 with the exception of the shape of the fixing means.

Hooking portions 30 are integrally formed on the fixing link member 11F, and these hooking portions 30 function as the fixing means. The hooking portions 30 are shaped so as to protrude from the outer surface of the left and right side plate portions 14 that constitute the fixing link member 11F. Each of the side plate portions 14 is provided with a pair of hooking portions 30 that are separated by a gap in the vertical direction. The pair of hooking portions 30 that are at different heights are arranged at substantially the same position in the length direction of the electrical wire guiding body 10. Each hooking portion 30 is constituted by a base portion 31 that protrudes from the outer surface of the side plate portion 14 in an approximately straight and horizontal manner and a lock portion 32 that extends upward from the projecting end of the base portion 31 in a cantilevered manner, thus being approximately L-shaped.

In the state where the self-adhesive cloth member 20 is wrapped around the electrical wire guiding body 10, the tips of the lock portions 32 of the hooking portions 30 on the fixing link member 11F hook the cloth-like member of the self-adhesive cloth member 20. This hooking action prevents positional shifting of the self-adhesive cloth member 20 relative to the electrical wire guiding body 10 in the length direction and circumferential direction.

In the electrical wire guiding apparatus B of the second embodiment, the fixing means for fixing the self-adhesive cloth member 20 to the electrical wire guiding body 10 is the hooking portions 30 that can become locked with the self-adhesive cloth member 20 and are integrally formed on the fixing link member 11F. According to this configuration, the hooking portions 30, which are the fixing means, are integrally formed with the fixing link member 11F, and therefore the number of necessary parts is lower than in the case where the fixing means is configured by a part that is separate from the fixing link member 11F.

Other Embodiments

The present invention is not limited to the embodiments described above using the foregoing description and drawings, and embodiments such as the following are also encompassed in the technical scope of the present invention.

Although the locking protrusions of the clips are locked to the receding portions of the coupling portions in the first embodiment, the locking protrusions may be locked to portions other than the receding portions of the coupling portions.

Although the receding portions that are the locking targets of the locking protrusions are formed for thickness reduction in the first embodiment, the locking targets of the locking protrusions may be portions formed for a purpose other than thickness reduction.

Although the locking targets of the locking protrusions (the receding portions) are formed for thickness reduction in the first embodiment, the locking targets of the locking protrusions may be formed for merely the purpose of locking the locking protrusions.

In the first and second embodiments, the self-adhesive cloth member is shaped as an approximately rectangular sheet having long sides with approximately the same dimension as the overall length of the electrical wire guiding body and short sides with a dimension somewhat larger than the circumference of the electrical wire guiding body, but the self-adhesive cloth member may have a tape-like shape. In this case, the self-adhesive cloth member need only be wrapped in a spiral manner around the electrical wire cover.

Although the pair of upper and lower hooking portions formed on each side plate portion are arranged at the same position as each other in the length direction of the electrical wire guiding body in the second embodiment, the pair of upper and lower hooking portions may be arranged at positions that are different from each other in the length direction of the electrical wire guiding body.

Although the pair of hooking portions on each side plate portion are arranged with a gap therebetween in the vertical direction in the second embodiment, the pair of hooking portions may be arranged at the same height.

Although two hooking portions are formed on each side plate portion in the second embodiment, the number of hooking portions formed on each side plate portion may be one or may be three or more.

Although the hooking portions are each bent so as to be approximately L-shaped in the second embodiment, the hooking portions may be shaped so as to protrude in a straight line.

A fixing means that is a combination of the fixing means (clip) described in the first embodiment and the fixing means (hooking portion) described in the second embodiment can be used as the fixing means for fixing the self-adhesive cloth member to the electrical wire guiding body.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An electrical wire guiding apparatus comprising:
   an electrical wire guiding body that is configured by coupling a plurality of link members in a single line so as to be capable of undergoing curving deformation and capable of receiving insertion of an electrical wire, at least one of the plurality of link members including a coupling portion with a shaft portion for coupling adjacent link members together, the shaft portion includes a receding portion;
   a self-adhesive cloth member that has stretchability and is wrapped around the electrical wire guiding body in a circumference direction so as to envelop the electrical wire guiding body; and
   a fixing means for fixing the self-adhesive cloth member to the electrical wire guiding body, the fixing means includes a clip that is a separate part from the plurality of link members and the self-adhesive cloth member and includes a body portion, an arm portion connected to the body portion, and a locking protrusion connected to the arm portion;
   wherein the locking protrusion of the clip locks into the receding portion of the at least one link member such that the clip sandwiches the self-adhesive cloth member with the at least one link member.

2. The electrical wire guiding apparatus according to claim 1, wherein the fixing means further includes
   a hooking portion that can be locked to the self-adhesive cloth member and is integrally formed with a link member among the plurality of link members.

3. The electrical wire guiding apparatus according to claim 2, wherein the hooking portion is bent so as to be approximately L-shaped.

* * * * *